US008936301B2

United States Patent
Thota et al.

(10) Patent No.: US 8,936,301 B2
(45) Date of Patent: Jan. 20, 2015

(54) VEHICLE LOAD FLOOR ASSEMBLY FOR A SEATBACK

(71) Applicant: Ford Global Technologies, LLC, Dearborn, MI (US)

(72) Inventors: Bhavani Thota, Sterling Heights, MI (US); Michael James Whitens, Milford, MI (US); Babak Shahmehri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/842,241

(22) Filed: Mar. 15, 2013

(65) Prior Publication Data

US 2014/0265418 A1    Sep. 18, 2014

(51) Int. Cl.
*B60N 3/00*      (2006.01)
*B60N 2/30*      (2006.01)
*B60R 5/04*      (2006.01)

(52) U.S. Cl.
CPC ............... *B60N 2/3011* (2013.01); *B60R 5/04* (2013.01)
USPC ............... 296/193.07; 296/65.16; 296/37.16; 296/66

(58) Field of Classification Search
USPC ................. 296/37.1, 24.43, 65.16, 69, 26.08, 296/26.09, 26.1, 26.11, 193.07, 65.01, 66
See application file for complete search history.

(56) References Cited

U.S. PATENT DOCUMENTS

| | | | |
|---|---|---|---|
| 2,956,837 A | 10/1960 | Koplin | |
| 3,202,453 A | 8/1965 | Richards | |
| 3,604,022 A | 9/1971 | Smith | |
| 4,428,611 A | 1/1984 | Widmer | |
| 4,443,034 A | 4/1984 | Beggs | |
| 5,322,335 A | 6/1994 | Niemi | |
| 6,089,641 A | 7/2000 | Mattarella et al. | |
| 6,406,084 B1 | 6/2002 | de Campos et al. | |
| 6,698,829 B1 | 3/2004 | Freijy et al. | |
| 6,702,355 B1 | 3/2004 | Price et al. | |
| 7,159,922 B2 * | 1/2007 | Iyoda et al. | ..... 296/66 |
| 8,353,550 B1 * | 1/2013 | Lucas | ..... 296/37.16 |
| 8,505,999 B2 | 8/2013 | Whalen et al. | |
| 8,528,957 B2 | 9/2013 | Ugalde et al. | |
| 2003/0057724 A1 | 3/2003 | Inagaki et al. | |

(Continued)

FOREIGN PATENT DOCUMENTS

JP      2003300431 A1      10/2003

OTHER PUBLICATIONS

AutoTruckToys.com. Printed Apr. 1, 2013, "Mopar OEM Dodge Ram Flat Load Floor". http://www.autotrucktoys.com/ram/Mopar-OEM-Dodge-Ram-Flat-Load-Floor-PRD27019.aspx. 1 page.

(Continued)

*Primary Examiner* — Joseph D Pape
(74) *Attorney, Agent, or Firm* — Vichit Chea; Price Heneveld LLP

(57) ABSTRACT

A vehicle load floor assembly includes a vehicle seat that has a seatback that pivots between upright and stowed positions. A cargo floor extends rearward from the seat. A first panel pivotally couples with a rear portion of the seatback and pivots to a raised position away from the seatback in the stowed position. A second panel couples with the first panel and is deployable rearward to engage the cargo floor with the first panel in the raised position to define a support surface.

16 Claims, 17 Drawing Sheets

(56) References Cited

U.S. PATENT DOCUMENTS

2009/0108639 A1 4/2009 Sturt et al.
2011/0133508 A1 6/2011 Zuelch
2013/0001972 A1 1/2013 Ugalde et al.
2013/0147226 A1 6/2013 Cao et al.

OTHER PUBLICATIONS

Plunkett, Bob. www.carlist.com. Publication Date Mar. 21, 2011, "2011 GMC Acadia Denali CUV". http://www.carlist.com/newcars/newcar.php?id=2051&yr=n. 2 pages.

* cited by examiner

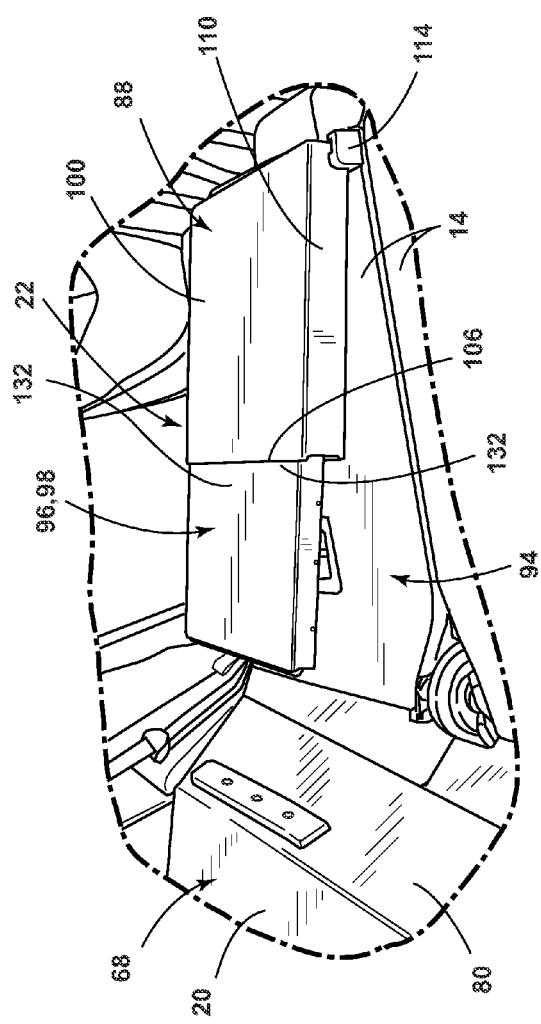
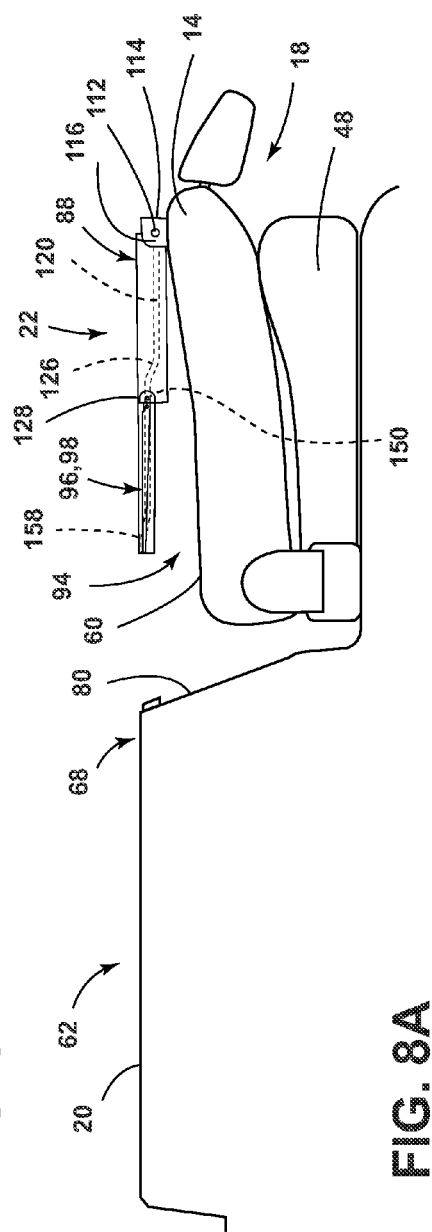
FIG. 8
FIG. 8A

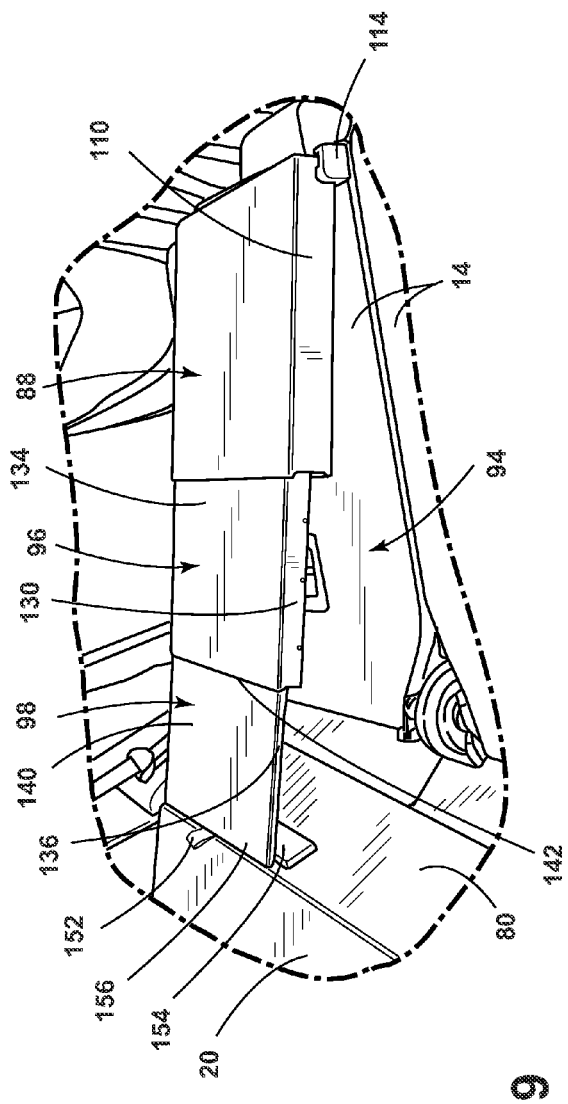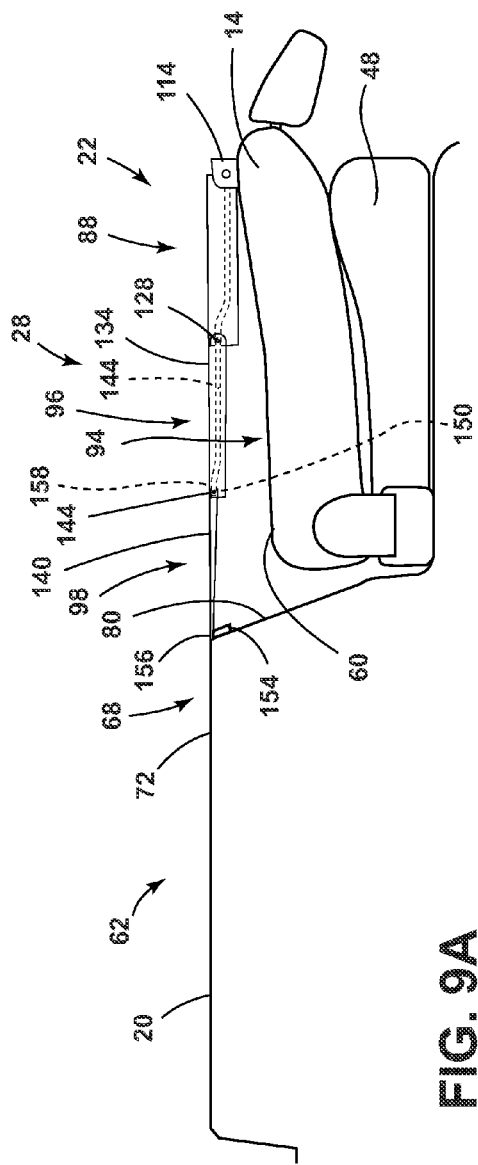

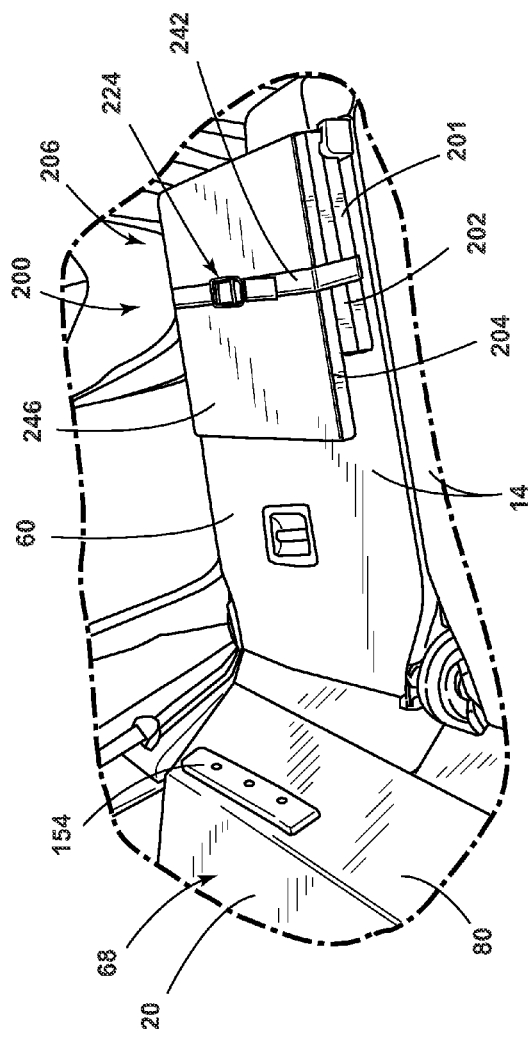
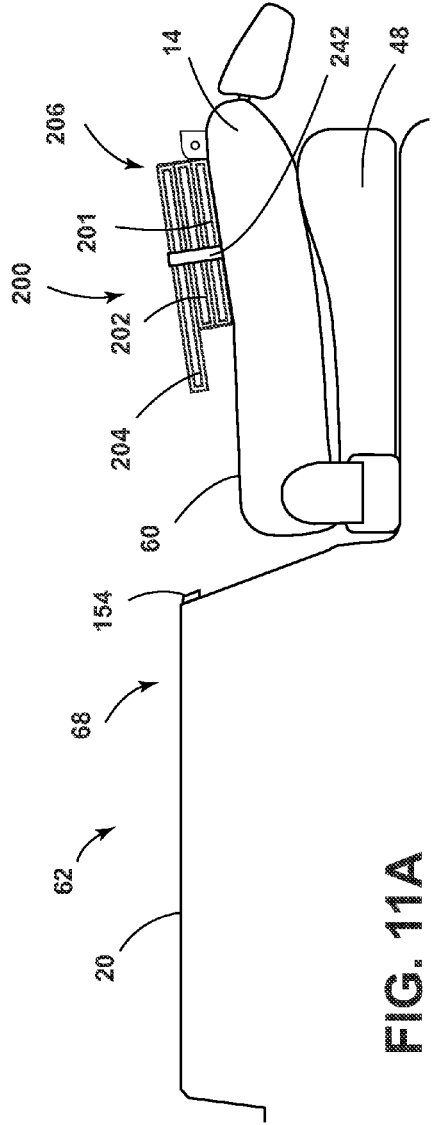
FIG. 11
FIG. 11A

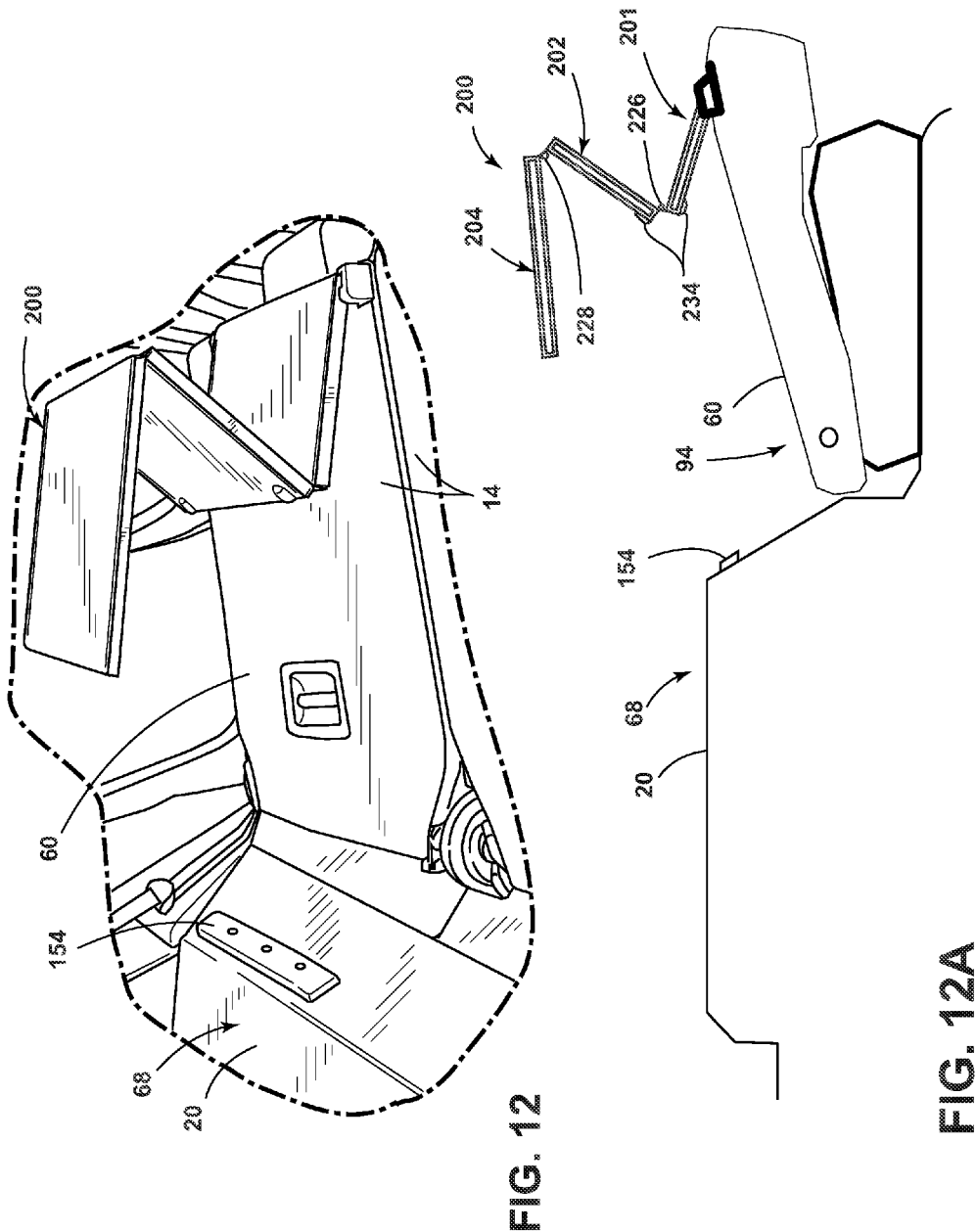

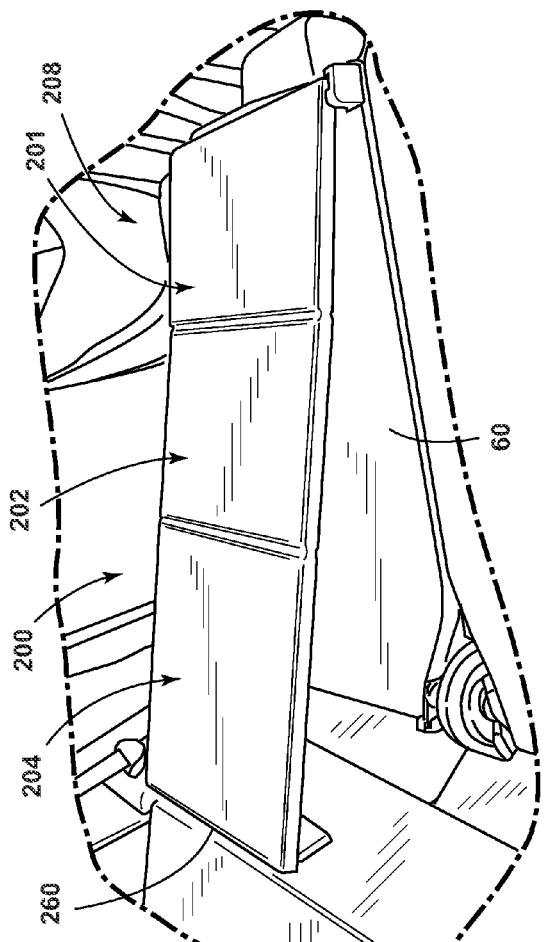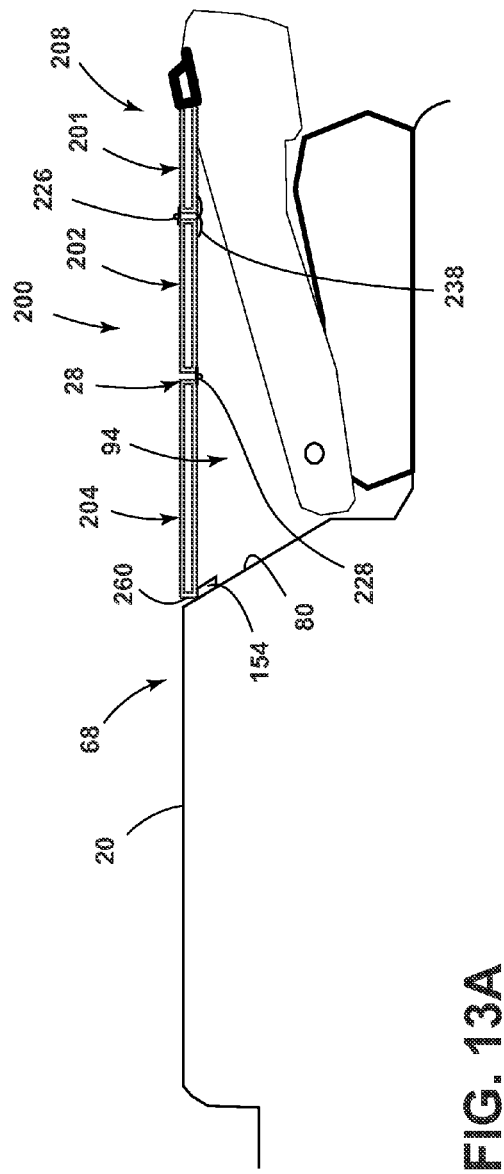

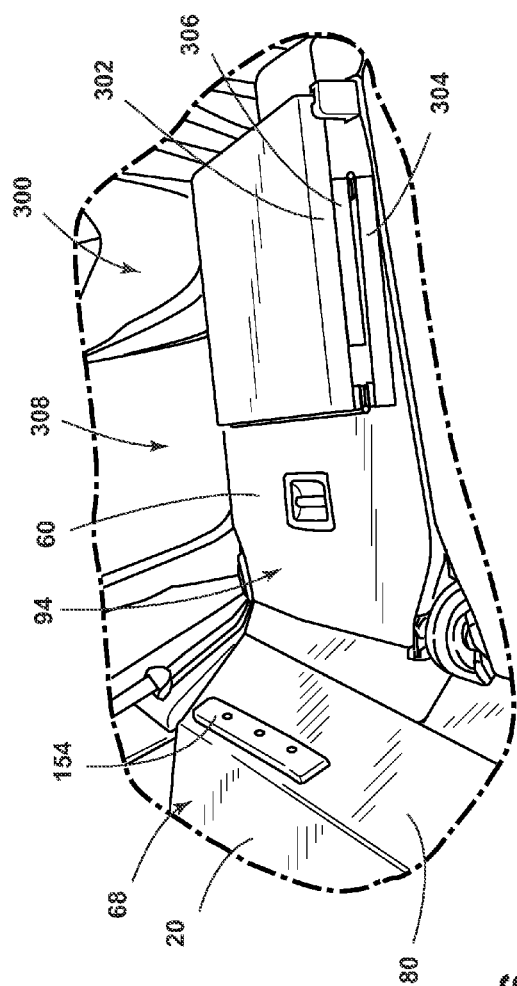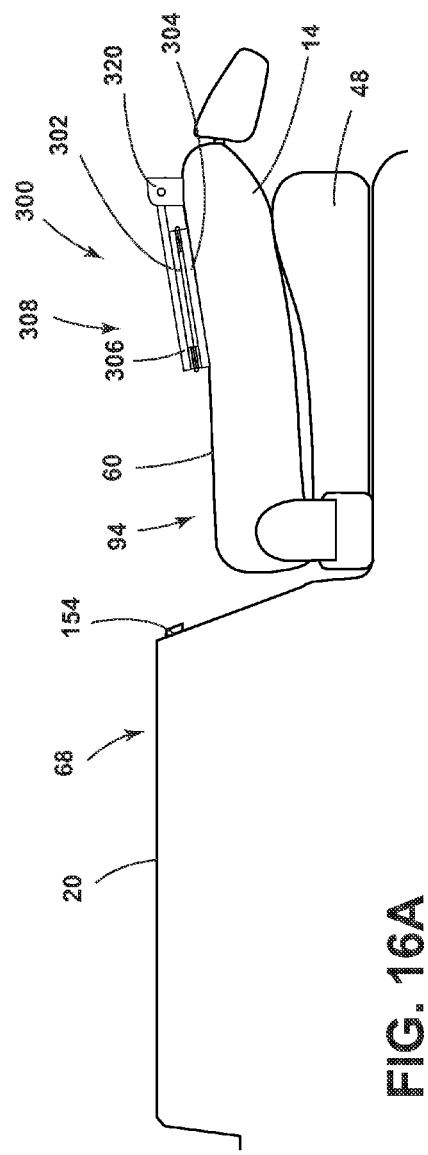
FIG. 16
FIG. 16A

VEHICLE LOAD FLOOR ASSEMBLY FOR A SEATBACK

FIELD OF THE INVENTION

The present invention generally relates to a load floor assembly, more specifically to a vehicle load floor assembly for a seatback.

BACKGROUND OF THE INVENTION

It is common for vehicles to include a cargo area behind a rear row of seats within the vehicle. Typically, the cargo area is defined between a floor extending between the rear row of seats and a rear opening of the vehicle. In some instances, the rear row of seats may be collapsible to expand the cargo area forward. Upon collapsing the seats, the floor of the cargo area may be uneven or otherwise unfit for supporting items or objects that are preferably transported on a substantially flat surface. In addition, the cargo areas of some modern vehicles are becoming more constrained due to smaller vehicle sizes as well as restricted with additional components such as batteries or fuel cells, which may cause the floor to have uneven, raised, or inconsistent surfaces.

SUMMARY OF THE INVENTION

According to one aspect of the present invention, a vehicle load floor assembly includes a vehicle seat that has a seatback pivotal between upright and stowed positions. A cargo floor extends rearward from the seat. A first panel pivotally couples with a rear portion of the seatback and pivots to a raised position away from the seatback in the stowed position. A second panel couples with the first panel and is deployable rearward to engage the cargo floor with the first panel in the raised position to define a support surface.

According to another aspect of the present invention, a cargo area of a vehicle includes a seatback that pivots between an upright position and a stowed position. A floor extends rearward from the seatback. A panel assembly is pivotally coupled with an upper portion of the seatback and is movable to a deployed position when the seatback is in the stowed position. The panel assembly in the deployed position extends a support surface to the floor.

According to another aspect of the present invention, a vehicle load floor assembly includes a seatback that pivots forward to a stowed position. A floor extends rearward from the seatback. A first panel has a top edge that pivotally couples with a rear portion of the seatback. A second panel couples with the first panel and is deployable from a bottom edge of the first panel with seatback in the stowed position to engage the floor.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8 is a top perspective view of the load floor assembly having a first panel of the panel assembly pivoted to a raised position and a second panel of the panel assembly deployed rearward from the first panel;

FIG. 8A is a schematic side elevational view of the load floor assembly, as shown in FIG. 8;

FIG. 9 is a top perspective view of the load floor assembly showing the panel assembly in a deployed position that extends a support surface to the floor of the cargo area;

FIG. 9A is a schematic side elevational view of the load floor assembly, as shown in FIG. 9, having a third panel deployed rearward from the second panel to engage the floor;

FIG. 11 is a top perspective view of the additional embodiment of the load floor assembly, as shown in FIG. 10, with the seatback in the forward stowed position;

FIG. 11A is a schematic side elevational view of the additional embodiment of the load floor assembly, as shown in FIG. 11, having a panel assembly in a retained position;

FIG. 12 is a top perspective view of the additional embodiment of the load floor assembly, as shown in FIG. 10, positioned between the retained position and a deployed position;

FIG. 12A is a schematic side elevational view of the load floor assembly, as shown in FIG. 12;

FIG. 13 is a top perspective view of the additional embodiment of the load floor assembly, as shown in FIG. 10, in the deployed position;

FIG. 13A is a schematic side elevational view of the additional embodiment of the load floor assembly as shown in FIG. 13;

FIG. 16 is a top perspective view of the additional embodiment of the load floor assembly, as shown in FIG. 14, with the seatback in the forward stowed position;

FIG. 16A is a schematic side elevational view of the additional embodiment of the load floor assembly, as shown in FIG. 16, having the panel assembly in the retained position;

DETAILED DESCRIPTION OF THE PREFERRED EMBODIMENTS

Figure 1:
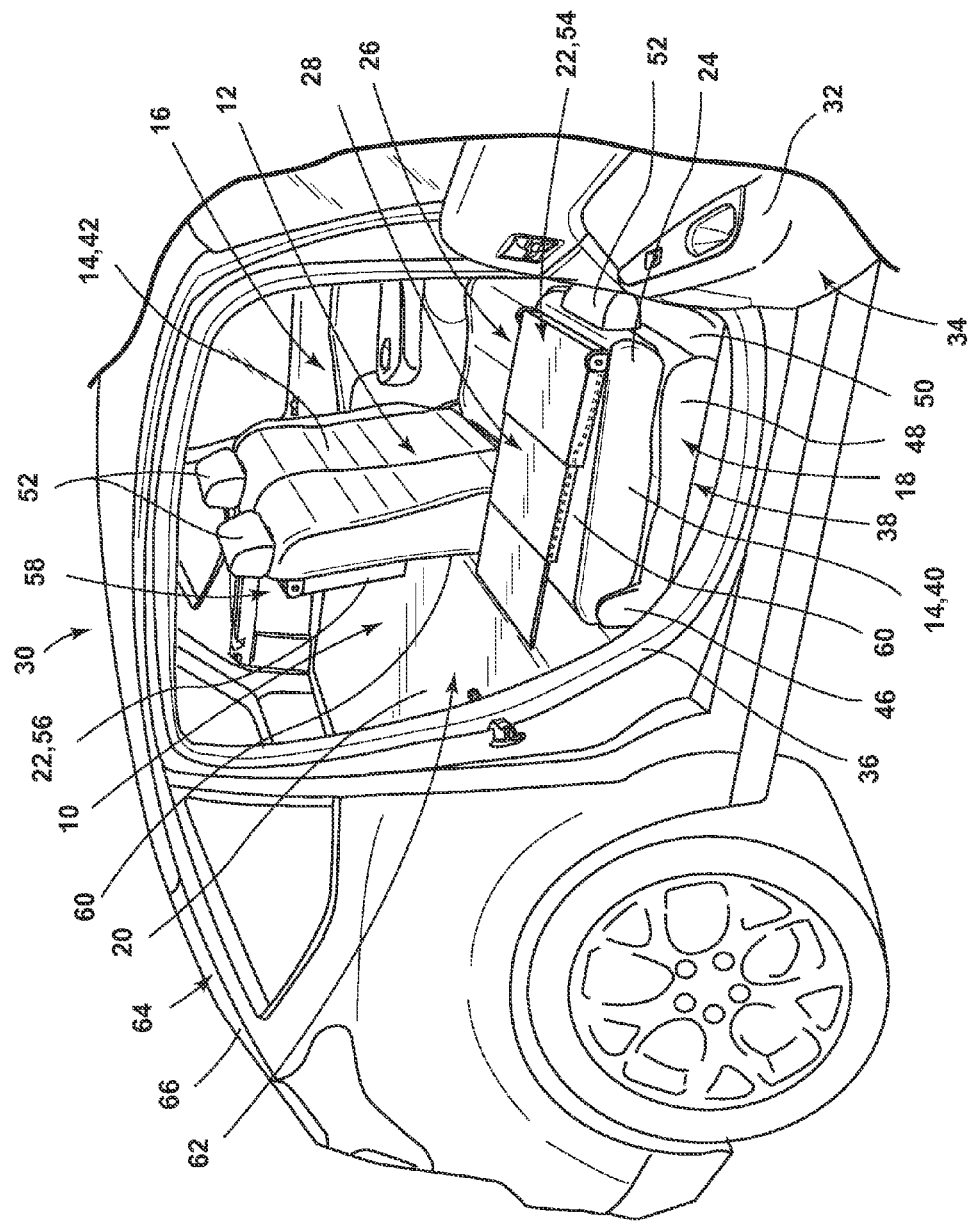
FIG. 1 is a top perspective view of a vehicle having a side door open to reveal a seatback of a rear row of seating in a forward stowed position to expose a cargo area.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-18A, reference numeral 10 generally designates a vehicle load floor assembly that includes a vehicle seat 12 having a seatback 14 that pivots between an upright position 16 and a stowed position 18. A floor 20 extends rearward from the seat 12. A panel assembly 22 is pivotally coupled with an upper portion 24 of the seatback 14. The panel assembly 22 is movable to a deployed position 26 that extends a support surface 28 to the floor 20 when the seatback 14 is in the stowed position 18.

Referring now to the embodiment illustrated in FIG. 1, a rear section 30 of the vehicle is shown with a passenger side door 32 in an open position 34 revealing a rear side door opening 36. In the illustrated embodiment, the vehicle is shown having a rear row of seating 38 adjacent the rear side door opening 36. It is contemplated that other vehicle types with various seating arrangements may be incorporated with the load floor assembly 10, as described herein, such as a sport utility vehicle that has a third row rearward the rear side door opening 36, a passenger van having a single sliding door opening and a number of rows of seating, or other conceivable vehicles with alternative seating arrangements from those illustrated. In the illustrated embodiments, the rear row of seating 38 includes a 60/40 division, such that the rear row of seating 38 has a first seatback 40 and a second seatback 42 disposed laterally adjacent to each other. Accordingly, the first seatback 40 occupies generally forty percent of the rear row of seating 38 and the second seatback 42 occupies generally sixty percent of the rear row of seating, 38 providing seating for one and two occupants, respectively, totaling three occupants in the rear row of seating 38. However it is contemplated that the rear row of seating 38 may include alternative proportional divisions between the first and second setbacks to accommodate various quantities of passengers, such as having two individual bucket seats to each accommodate a single occupant, similar to a forward row of seating 44 (FIG. 2).

As further illustrated in FIG. 1, the first and second seatbacks 40, 42 are each independently pivotal between the upright position 16 and the forward stowed position 18, pivoting about a pivotal connection 46 between the respective seatback 14 and a seat portion 48 of the vehicle seats 12. The seat portions 48 of each vehicle seat 12 is positioned rearward a foot well 50 that is located between the rear row of seating 38 and the front row of seating (FIG. 2). The first seatback 40 of the rear row of seating 38 is shown in the forward stowed position 18, positioning a head restraint 52 that is coupled with the upper portion of the first seatback 40 within the foot well 50. The second seatback 42 is shown in the upright position 16 and two head restraints 52 are similarly coupled with the upper portion of the second seatback 42. The first and second seatbacks 40, 42 include a first panel assembly 54 and a second panel assembly 56, respectively, pivotally coupled with the upper portion of the seatbacks 14. The second panel assembly 56 is shown in a retained position 58 or stored position, aligned with a rear surface 60 of the second seatback 42. The first panel assembly 54 is shown in a deployed position 26 extending a rigid support surface 28 to the floor 20 of a cargo area 62 of the vehicle that spans rearward from the seatbacks 14 to a rear opening 64 of the vehicle. In the illustrated embodiment, the rear opening 64 is enclosed with a hatch door 66. It is also contemplated that the rear opening 64 may be alternatively enclosed with a trunk, a pair of vertical doors, or other conceivable rear opening 64 enclosures, as generally understood by one having skill in the art.

Figure 2:
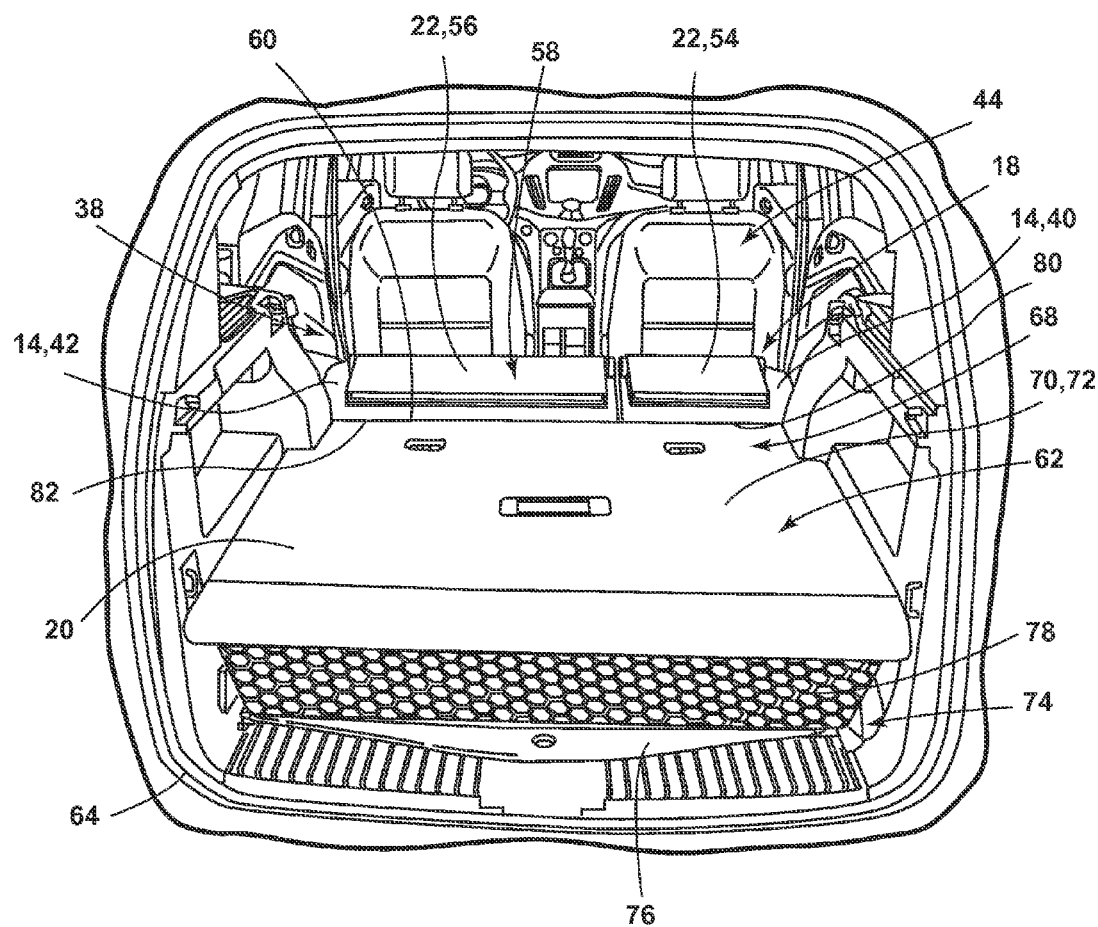
FIG. 2 is a top perspective view of a rear opening of the vehicle, showing the cargo area and the seatbacks of the rear row of seating in the forward stowed position.

As shown in FIG. 2, the first and second seatbacks 40, 42 of the rear row of seating 38 are in the forward stowed position 18 and the corresponding first and second panel assemblies 54, 56 are in the retained position 58, providing an uneven surface between the floor 20 of the cargo area 62 and the rear surface 60 of the seatbacks 14. The floor 20 of the cargo area 62 includes a forward region 68 proximate the rear row of seating 38 having an elevated portion 70 with a generally horizontal top surface 72 that is elevated above the seatbacks 14 in the stowed position 18. A rearward region 74 of the cargo floor 20 is disposed proximate the rear opening 64 and has a lower horizontal surface 76 than the elevated portion 70 of the forward region 68. The cargo area 62 is further defined by a substantially vertical mesh curtain 78 that extends from the rearward region 74 of the cargo floor 20 to the top surface of the elevated portion 70. Similarly, a substantially vertical front wall 80 (FIG. 6) extends downward from a forward edge 82 of the elevated portion 70 proximate the rear row of seating 38, as described in more detail below. The elevated portion 70 is configured to support various cargo items and is adapted to conceal a battery used for operating the vehicle. It is also conceivable that the elevated portion 70 may additionally or alternatively be adapted to conceal a spare tire, a storage compartment, and other commonly concealed vehicle components. It is also conceivable that the lower surface of the rearward region 74 of the cargo floor 20 may be altered from the illustrated embodiment to extend forward to occupy more of the cargo floor 20, and additionally, it is contemplated that the cargo area 62 may alternatively include a more elevated portion 70 in the rearward region 74 that is elevated above the forward region 68.

Figure 3:
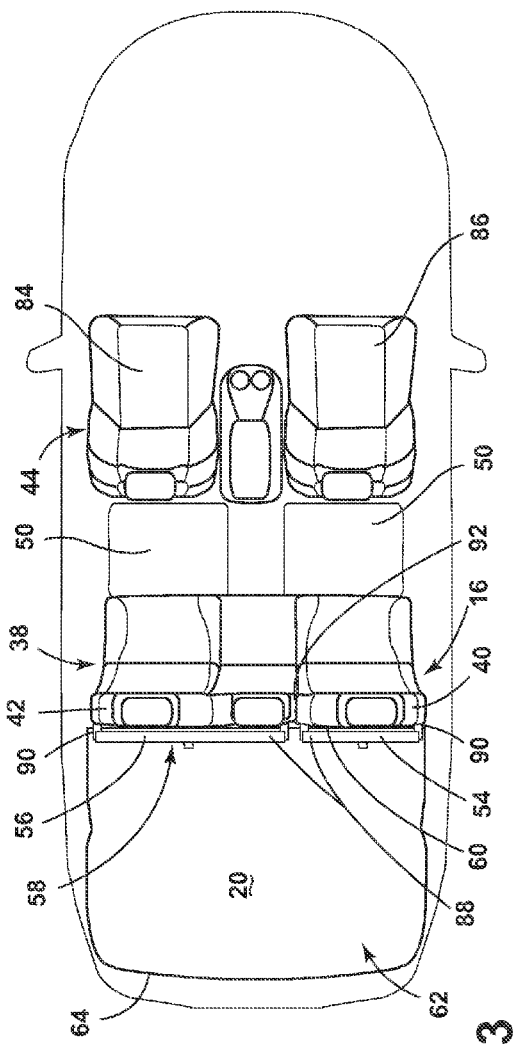
FIG. 3 is a top plan view of the interior portion of the vehicle, showing the seatbacks of the rear row of seating in an upright position.
Figure 4:
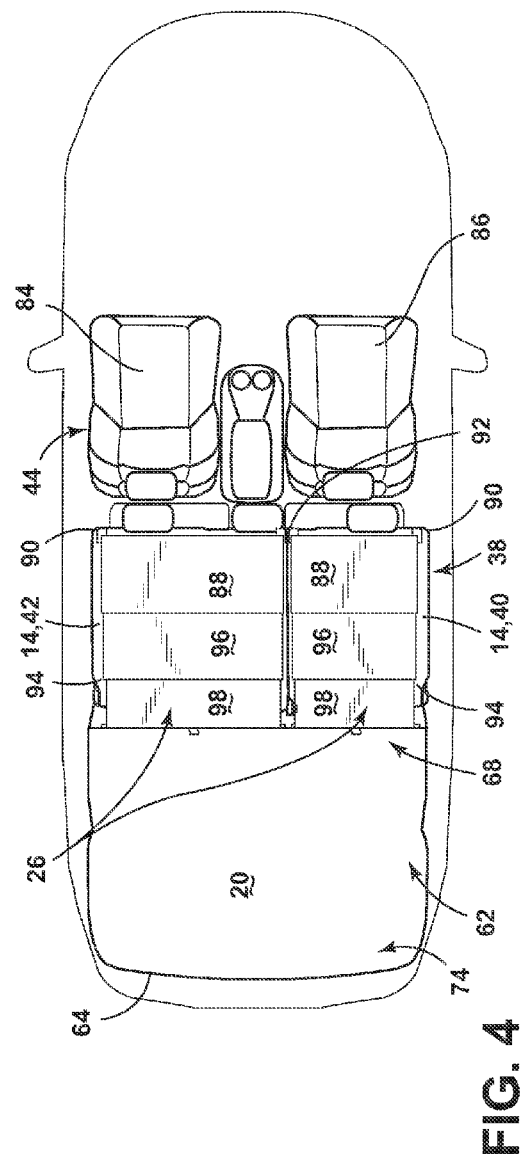
FIG. 4 is a top plan view of the interior portion of the vehicle, showing the seatbacks of the rear row of seats in the forward stowed position and a panel assembly extending to a floor of the cargo area.

Referring now to FIGS. 3-4, the front row of seating 44 is disposed forward the rear row of seating 38 and includes a driver seat 84 and a passenger seat 86, as generally understood in the art. As shown in FIG. 3, the first and second seatbacks 40, 42 of the rear row of seating 38 are in the upright position 16. Also, the first and second panel assemblies 54, 56 on the respective first and second seatbacks 40, 42 are shown in the retained position 58 and secured to the rear surface 60 of the respective seatback 14, in the illustrated embodiment. The first and second panel assemblies 54, 56, as shown, each include a first panel 88 pivotally coupled with the rear surface 60 of the respective seatback 14 (FIG. 1) and that extend laterally between an outboard edge 90 of the seatback 14 and an inboard edge 92 of the respective seatback 14. Accordingly, the first panels of the first and second seatbacks 40, 42 together span substantially laterally across the rear row of seating 38. As shown in the embodiment illustrated in FIG. 4, the first and second seatbacks 40, 42 are moved to the stowed positions 18 and the panel assembly 22 is deployed rearward over a lower portion 94 of the seatback 14 to engage the floor 20 of the cargo area 62, defining the support surface 28 configured to support at least one cargo item. More specifically, in the illustrated embodiment, a second panel 96 is deployed rearward from each of the first panels and a third panel 98 is deployed rearward from each of the second panels 96 to engage the floor 20 of the cargo area 62. It is conceivable that the panel assemblies may include more or fewer individual panels to span between the respective seatback 14 and the floor 20 of the cargo area 62. Further, it is contemplated that the panel assemblies may alternatively deploy rearward, as described in more detail below.

Figure 5:
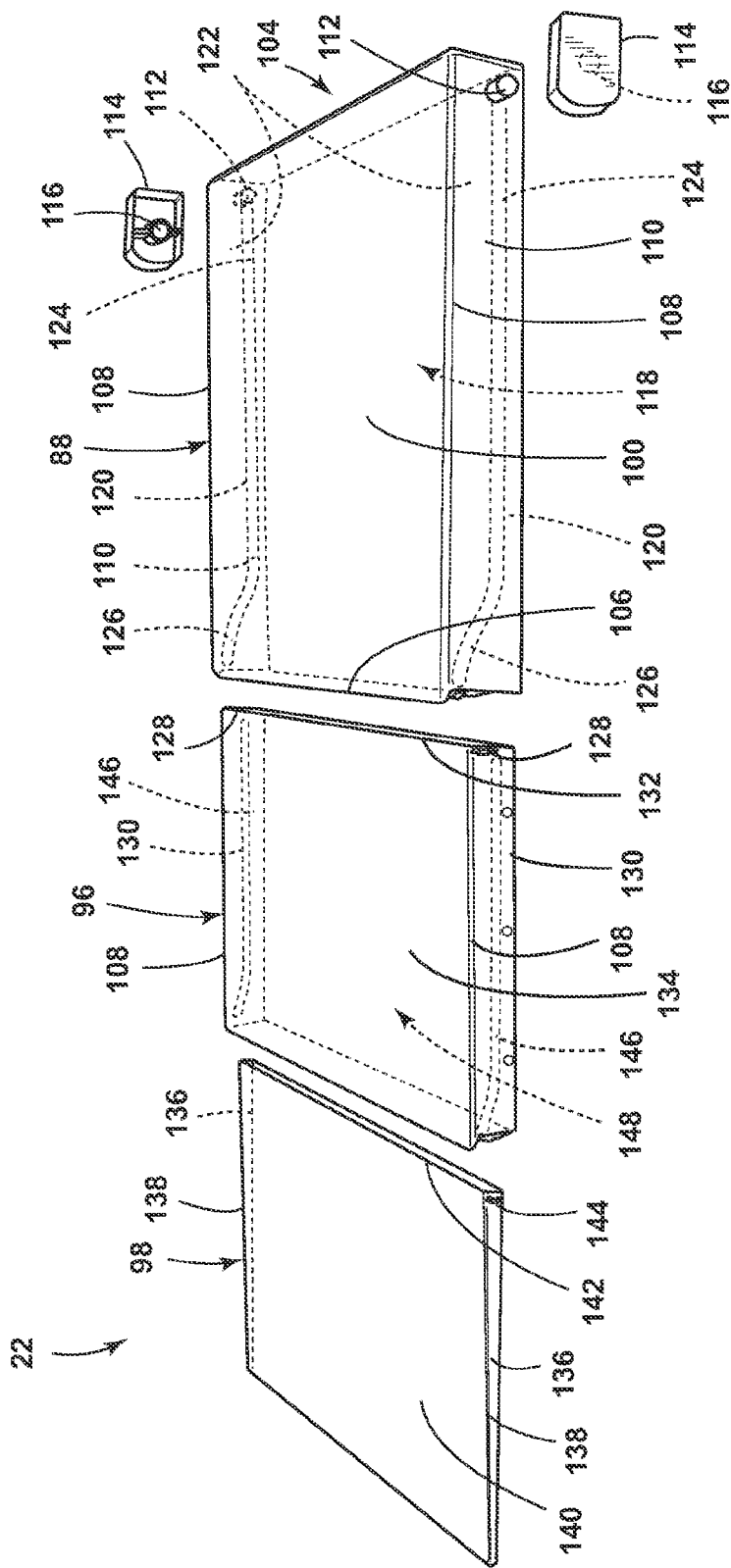
FIG. 5 is an exploded top perspective view of the load floor assembly.

One embodiment of the panel assembly 22, as illustrated in FIG. 5, includes the first, second, and third panels 88, 96, 98, separated for purposes of description. The illustrated panel assembly 22 slideably interconnects the first, second, and third panels 88, 96, 98 to allow the panel assembly 22 to move between the retained and deployed positions 58, 26 shown in FIGS. 3-4. The first panel has a generally planar upper surface 100 that extends longitudinally between a front edge 102 of the first panel, corresponding with a forward end 104 of the panel assembly 22 and a rear edge 106 of the first panel. The first panel also spans laterally between the generally linear side edges 108. The first panel also includes lateral sidewalls 110 that extend downward from the linear side edges 108 that laterally border the upper surface 100. A pivot pin 112 extends outward from each of the lateral sidewalls 110 proximate the forward end 104 of the panel assembly 108. The pivot pins 112 are coaxially aligned with each other and are each configured to pivotally couple with a bracket 114 that has a rotation aperture 116 adapted to receive the pivot pin 112. The rotation apertures 116 of the brackets 114 facilitate the pivotal engagement between the first panel and the upper portion 24 of the seatback 14. It is also contemplated the various alternative pivotal couplings may be employed between the first panel and the seatback 14 proximate the forward end 104 of the panel assembly, as generally understood by one having ordinary skill in the art.

As further shown in FIG. 5, the first panel includes a hollow interior portion 118 that is partially defined between the lateral sidewalls 110 that extend down from the side edges 108 of the upper surface 134 of the first panel. A channel 120 is formed on an interior surface 122 of each of the lateral sidewalls 110, as illustrated in dashed lines. The channel 120 has a generally linear portion 124 extending rearward from the forward end 104 of the panel assembly and a curved portion 126 proximate the rear edge 106. The curved portion 126 extends rearward and downward from the upper surface 100 to transition into alignment with and to connect with the linear portion 124 of the channel 120. The second panel 96 has a substantially similar construction to the first panel, but includes a narrower width between the side edges 108 of the upper surface 134 of the second panel 96, such that the second panel 96 may fit within the interior portion 118 of the first panel. In addition, the second panel 96 includes an attachment feature 128 that protrudes outward from each of the lateral sidewalls 110 proximate a forward edge 132 of the upper surface 134. The attachment features 128 are configured to slideably engage the channels 120 of the first panel, such that the second panel 96 may slide along the channels 120 from the deployed position 26 to a concealed position entirely within the interior portion 118 of the first panel. It is conceivable that the second panel 96 may not be entirely concealed, and additionally the second panel 96 may slideably engage an exterior portion or other alternative sliding features on the first panel.

Still referring to FIG. 5, the third panel 98 includes lateral flanges 136 that extend down from the side edges 138 of the upper surface 140 of the third panel 98 and taper in height from the front edge 142 of the third panel 98 to the rearward end of the panel assembly. The third panel 98 also includes attachment features 144 protruding outward from the lateral flanges 136 proximate the front edge 142. Similarly, the attachment features 128 on the third panel 98 slidably engage the channels 146 on the interior surface 148 of the lateral sidewalls 130 of the second panel 96 to allow the third panel 98 to slide on the channels 146 entirely within the hollow interior portion 148 of the second panel 96, as described in more detail below. It is contemplated that the channels 146 may be alternatively shaped and that alternative sliding features from the channels 120, 146 and attachment features 128, 144 may be employed between the first and second panels 88, 96 and the second and third panels 96, 98, such as a track assembly, a pneumatic actuator, or other alternative sliding features.

Figure 6:
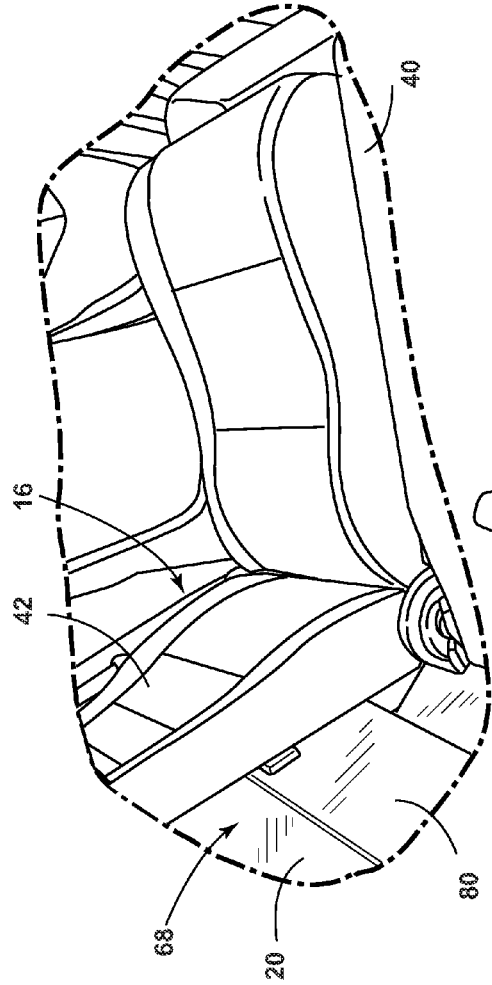
FIG. 6 is a top perspective view of the load floor assembly with the seatback in the upright position.
Figure 6A:
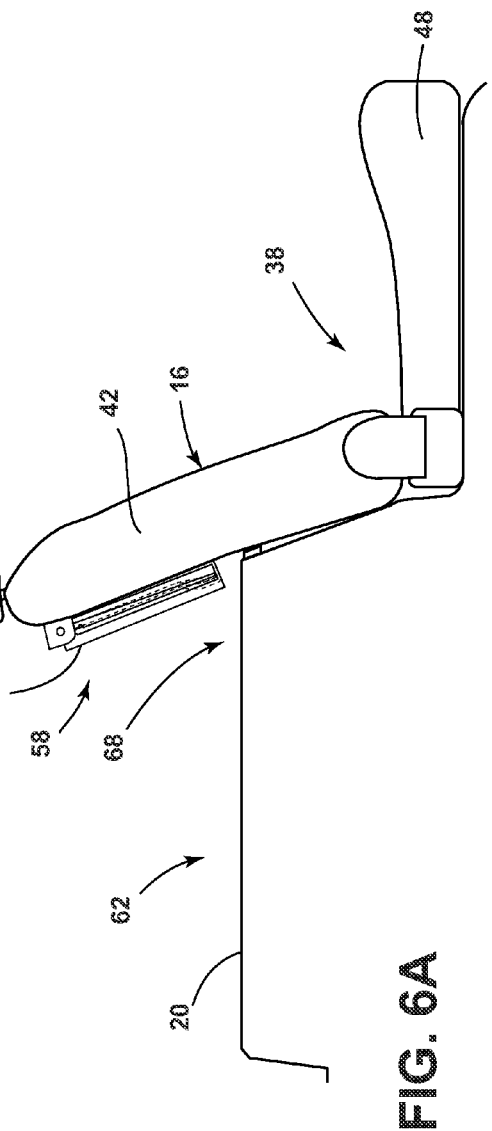
FIG. 6A is a schematic side elevational view of the load floor assembly, as shown in FIG. 6, having the panel assembly in a retained position.

Referring now to FIGS. 6-6A, the first seatback 40 is shown in the forward stowed position and the second seatback 42 is in the upright position 16, in close proximity with the front wall 80 of the forward region 68 of the cargo area 62. As also shown, the panel assembly 22 is in the retained position 58, whereby the second and third panels, 96, 98 are slidably engaged and concealed within the interior portion 118 of the first panel, whereby the third panel 98 is slidably engaged within the interior portion 148 of the second panel 96. In the retained position 58, the panel assembly 22 is secured in alignment with the rear surface 60 of the seatback 14 and is elevated above the forward region 68 of the cargo floor 20. It is contemplated that the panel assembly 22 may be secured with a retention feature, such as a strap, a magnetic arrangement, a mechanical fastener, or other conceivable retention features. It is also contemplated that the upright position 16 of the seatback 14 as shown may include other substantially upright orientations or angles of the seatback 14 relative to the seat, such as a slightly more reclined angle or a substantially more upright angle relative to the seat portion 48 of the rear row of seating 38.

Figure 7:
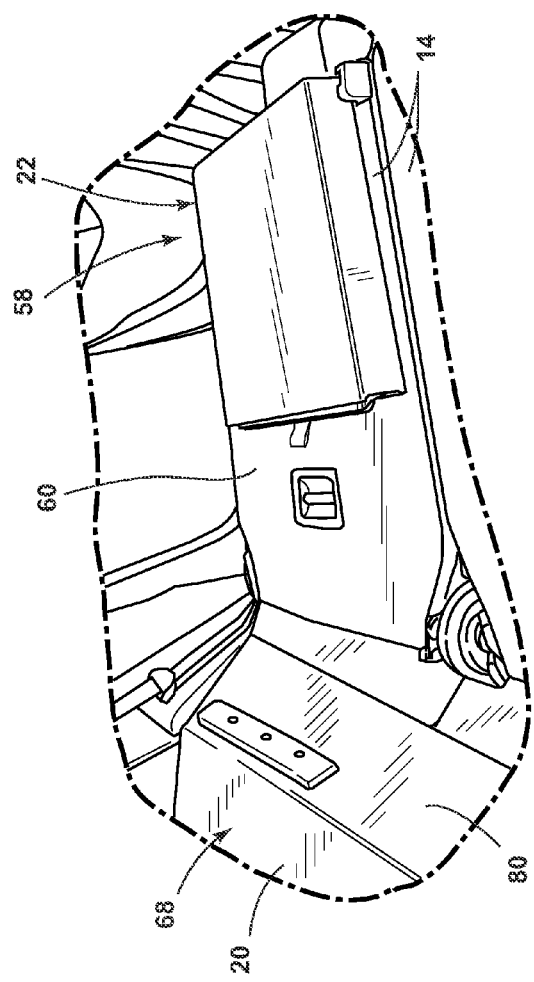
FIG. 7 is a top perspective view of the load floor assembly with the seatback in the forward stowed position.
Figure 7A:
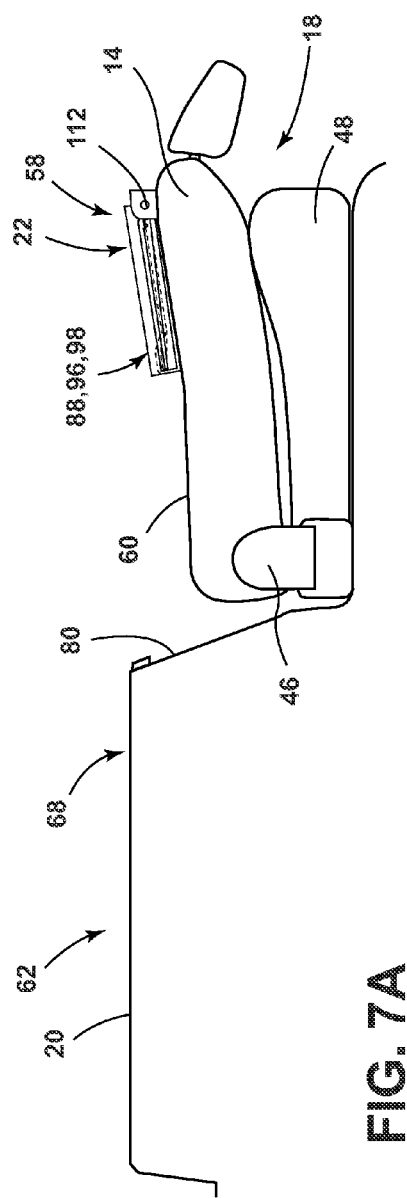
FIG. 7A is a schematic side elevational view of the load floor assembly, as shown in FIG. 7, having the panel assembly in the retained position.

In operation of the load floor assembly 10 from the seatback 14 in the upright position 16, the seatback 14 is pivoted about the pivotal connection 46 with the seat portion 48 to the forward stowed position 18, as shown in FIGS. 7-7A. In the forward stowed position 18, a back support surface of the seatback 14 is in generally abutting contact with a seat surface of the seat portion 48. Initially, upon moving the seatback 14 to the forward stowed position 18, the panel assembly remains in the stored position in abutting contact with the rear surface 60 of the seatback 14. Before deploying the load panel assembly from the stored position 58, any retention feature securing the panel assembly to the rear surface 60 of the seatback 14 are disengaged. It is also contemplated that the forward stowed position 18 of the seatback 14 may include other forward pivoted orientations or angles of the seatback 14 relative to the seat, such as a slightly more upward or downward angle relative to the seat portion 48.

The embodiment of the panel assembly, as illustrated in FIGS. 8-8A, is partially deployed rearward. As such, the first panel 88 is pivotally raised away from the rear surface 60 of the seatback 14, pivoting about the pivot pins 112 residing in rotational engagement with the rotation apertures 116 of the brackets 114. Further, the second panel 96 of the panel assembly is slid out from the interior portion of the first panel. More specifically, the attachment features are slid rearward within the channels 120 on the opposing interior surfaces 122 of the lateral sidewalls 110. As the attachment features are slid onto the curved portion 126 of the channels 120, the second panel 96 is raised relative to the first panel to place the upper surface of the second panel 96 in planar alignment with the upper surface of the first panel. A distal end 150 of the channel 120 retains the attachment feature from disengaging from the channel 120 and prevents the second panel 96 from being entirely removed and separated from the first panel. It is conceivable that the longitudinal length of the either or both of the first and second panels 88, 96 may be lengthened to allow the second panel 96 to engage the floor 20 of the cargo area 62.

As shown in FIGS. 9-9A, the panel assembly of the illustrated embodiment is deployed rearward and engaged with the cargo floor 20 to define the support surface 28. To complete the engagement, the third panel 98 of the panel assembly is slid out from the interior portion 148 of the second panel 96. The rear edge 156 of the third panel 98 includes a pull tab 152 comprised of a fabric material to facilitate deploying the panel assembly rearward. Upon sliding the third panel 98 rearward, the attachment features 144 of the third panel 98 slide rearward within the channels 146 on the opposing interior surfaces of the lateral sidewalls 130 of the second panel 96. A distal end 150 of the channels 146 on the second panel 96 similarly retain the attachment feature 144 on the third panel 98 from disengaging from the channel 146 and prevents the third panel 98 from being entirely removed and separated from the second panel 96. The curved portion 158 of the channels 144 on the second panel 96 also similarly raises the third panel 98 and places the upper surface 140 in substantially planar alignment with the upper surface 134 of the second panel 96. In addition, the rearward edge 156 of the third panel 98 engages and is supported by a ledge member 154 that is coupled with the front wall 80 of the cargo area 62. The ledge member 154 is coupled a distance below the top surface 72 of the elevated portion 70 of the cargo floor 20 substantially equivalent to the thickness of the rear edge 156 of the third panel 98, such that the upper surface 140 of the third panel 98 is in generally planar alignment with the top surface 72 of the cargo floor 20. Accordingly, the support surface 28 defined by the aligned upper surfaces of the first, second, and third panels 88, 96, 98 is placed in planar alignment with the top surface 72 of the cargo floor 20 to provide a substantially flat surface to support an object that is preferably carried on such a flat surface, and to support other types of objects.

Figure 10:
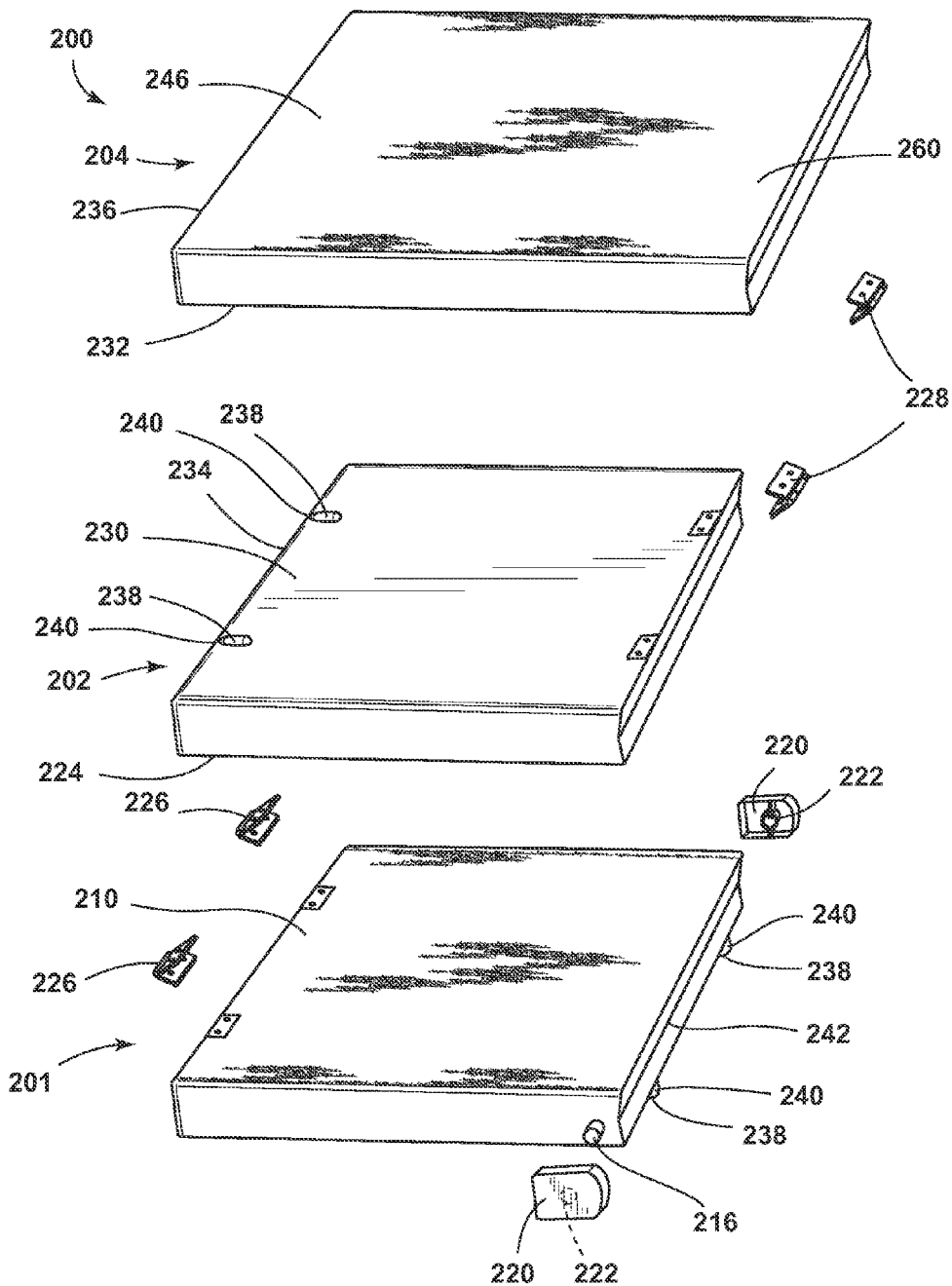
FIG. 10 is an exploded top perspective view of an additional embodiment of the load floor assembly.

Referring now to FIG. 10, an additional embodiment of the load floor assembly 10 includes a panel assembly 200, having a first panel 201, a second panel 202, and a third panel 204 that are aligned to engage in a folding arrangement for moving between a retained position 206 (FIG. 11) and a deployed position 208 (FIG. 13). The first, second, and third panels 201, 202, 204 of the illustrated additional embodiment are substantially rigid and do not include an interior portion for storing the other panels. However, the first panel includes a planar upper surface 210 having lateral sidewalls 212 extending down from the opposing lateral edges 214 of the upper surface 210. The sidewalls 212 each include a pivot pin 216 extending orthogonally outward from the sidewalls 212 proximate the forward edge 218 of the first panel. The pivot pins 216 are coaxially aligned with each other and are each configured to pivotally couple with a bracket 220 that has a rotation aperture 222 adapted to receive the pivot pin 216. The rotation apertures 222 of the brackets 220 facilitate the pivotal engagement between the first panel and the upper portion 24 of the seatback 14. It is contemplated the various alternative pivotal couplings may be employed between the first panel and the seatback 14, as generally understood by one having ordinary skill in the art.

As further illustrated in FIG. 10, the second panel 202 has a substantially similar size to the first panel and includes an upper surface 224 that, in the illustrated exploded stored position arrangement, is aligned to abut the upper surface 210 of the first panel. A first pair of hinges 226 is couple between the upper surfaces 224 of the first and second panels 201, 202 to provide a lateral pivot axis between the first and second panels 201, 202 proximate the upper surfaces 224. Accordingly, in the retained position 206, the first and second panels 201, 202 of the illustrated embodiment pivot toward each other to engage upper surfaces 210, 224. A second pair of hinges 228 is coupled between a bottom surface 230 of the second panel 202 and a bottom surface 232 of the third panel 204, proximate a rearward edge 234 of the second panel 202 and a rearward edge 236 of the third panel 204. Therefore, the bottom surfaces 230 of the second and third panels 202, 204 are configured to pivot toward each other with the panel assembly in the retained position 206. In addition, two sets of couplings 238 are disposed on the bottom surfaces 230 of the first and second panels 201, 202. The couplings 238 each include a connecting portion 240 that removably engages a corresponding connecting portion 240, such as a magnetic attachment. As such, the couplings 238 on a rear edge 242 of the first panel are aligned to engage the couplings 238 on the forward edge 235 of the second panel 202 when the panel assembly moves to the deployed position 208. The couplings 238 are arranged to provide support between the first and second panels 201, 202 and to maintain the panels in substantially planar alignment in the deployed position 208. It is contemplated that the couplings 238 may be alternatively arranged, such as being contained within an edge portion 240 of the panels.

As illustrated in FIGS. 11-11A, the additional embodiment of the load floor assembly 10 is shown with the panel assembly 200 in the stored position and the seatback 14 in the forward stowed position 18. The panel assembly 200 is in the stored position in abutting contact with the rear surface 60 of the seatback 14 and includes a retention feature 242 securing the panel assembly to the rear surface 60 of the seatback 14. The retention feature is a nylon strap 242 that extends from the rear surface 60 of the seatback 14 and connects across the upper surface 246 of the third panel 204 to hold the panel assembly against the seatback 14. The strap 242 includes a clasp assembly 244 that detachably couples the retention feature 242.

The additional embodiment of the panel assembly 200, as shown in FIGS. 12-12A, is partially deployed rearward. As shown, the first panel is pivotally raised away from the rear surface 60 of the seatback 14. Also, the second panel 202 is pivoted about the first pair of hinges 226 away from the first panel, which disengages the upper surfaces of the first and second panels 201, 202. Further, the third panel 204 pivots away from the second panel 202 about the second pair of hinges 228 disengaging the bottom surfaces of the second and third panels 202, 204. It is contemplated that in operation, the user may raise the third panel 204 to raise the first and second panels 201, 202 to the positions illustrated in FIGS. 12-12A. It is also contemplated that user may manipulate the first and second panels 201, 202 in addition to the third panel 204 to move the panels out of the stored position (FIGS. 11-11A).

As shown in FIGS. 13-13A, the additional embodiment of the panel assembly 200 is deployed rearward and engaged with the cargo floor 20 to define the support surface 28. To complete the engagement, the second panel 202 is pivoted further away from the first panel and the third panel 204 is pivoted further away from the second panel 202, placing the first, second, and third panels 201, 202, 204 in substantially linear alignment. More specifically, the upper surfaces of the first, second, and third panels 201, 202, 204 are placed in generally planar alignment and are in generally planar alignment with the top surface of the cargo floor 20. The first pair of hinges 226 are arranged on the upper surface and accordingly do not vertically support the first or second panel 201, 202 in planar alignment. Therefore, the two sets of couplings 238 engage between the bottom surfaces 230 of the first and second panels 201, 202 to provide horizontal support to the first and second panels 201, 202.

As also illustrated in the additional embodiment of the panel assembly 200 shown in FIGS. 13-13A, the rear edge 260 of the third panel 204 engages and is supported by the ledge member 154 that is coupled with the front wall 80 of the cargo area 62. Again, the ledge member 154 is coupled at a distance below the top surface of the elevated portion 70 of the cargo floor 20 substantially equivalent to the thickness of the third panel 204, such that the upper surface of the third panel 204 is in generally planar alignment with the top surface of the cargo floor 20. Accordingly, the support surface 28 in the additional embodiment is defined by the aligned upper surfaces of the first, second, and third panels 201, 202, 204. The support surface 28 is placed in planar alignment with the top surface of the cargo floor 20 to provide a substantially flat surface to support an object that is preferably carried on such a flat surface and to support other types of objects. It is contemplated that the additional embodiment of the panel assembly 200 may also be varied to include more or fewer panels to engage the floor 20 of the cargo area 62. As such, it is conceivable that the longitudinal length of the either or both of the first and second panels 201, 202 may be lengthened to allow the second panel 202 to engage the floor 20 of the cargo area 62, and thereby omit the third panel 204.

Figure 14:
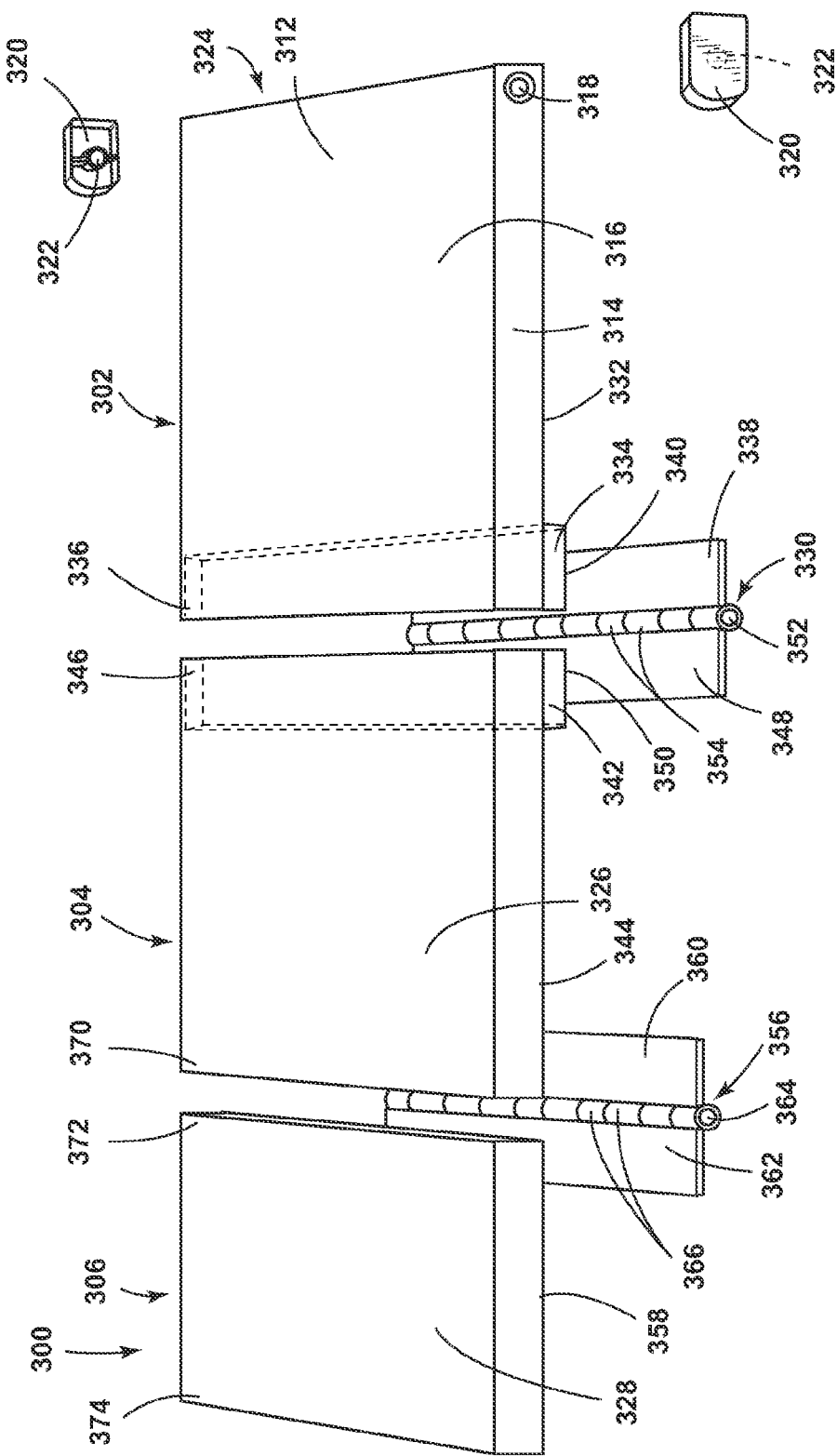
FIG. 14 is an exploded top perspective view of an yet additional embodiment of the load floor assembly.

According to yet another embodiment of the vehicle load floor 10, as illustrated in FIG. 14, a foldable panel assembly 300 includes a first panel 302, a second panel 304, and a third panel 306 that are movable between a stored position 308 and a deployed position 310. The first panel 302 includes a substantially planar upper surface 312 having lateral sidewalls 314 extending down from the opposing lateral edges 316 of the upper surface 312. The sidewalls 314 of the first panel 302 each include a pivot pin 318 extending orthogonally outward from the sidewalls 314 proximate the forward edge 320 of the first panel 302. The pivot pins 318 are coaxially aligned with each other and are each configured to pivotally couple with a bracket 320 that has a rotation aperture 322 adapted to receive the pivot pin 318. The rotation apertures 322 of the brackets 320 facilitate the pivotal engagement between the first panel 302 and the upper portion 24 of the seatback 14. It is further contemplated the various alternative pivotal couplings may be employed between the first panel 302 and the seatback 14, as generally understood by one having ordinary skill in the art.

As further illustrate the embodiment shown in FIG. 14, the second panel 304 of the foldable panel assembly 300 has a substantially similar size to the first panel 302, but includes a slightly reduced longitudinal length to provide space proximate the forward end 324 of the panel assembly 300 in the stored position 308. The second panel 304 also includes a substantially planar upper surface 326 having a lateral width generally equivalent to the first panel 302. The third panel 306 also includes a substantially planar upper surface 328 and a generally equivalent width to the first and second panels 302, 304. The longitudinal length of the third panel 306, however, is substantially less than the first and second panels 302, 304 to provide an area for the panel assembly 300 to move to the stored position 308. It is conceivable that the relative lengths and dimensions of the panel assembly 300 illustrated in FIG. 14 may vary to accommodate alternative seat structures and load bearing desires.

Still referring to FIG. 14, a first hinge 330 is coupled between a bottom surface 332 of the first panel 302 and a bottom surface 332 of the second panel 304. More specifically, a first spacer 334, having a generally rectangular prism shape, is coupled with the bottom surface 332 of the first panel 302 along the rear edge 336 of the first panel 302. A first plate 338 of the first hinge 330 is coupled with a lower surface 340 of the first spacer 334. Similarly, a second spacer 342, having a generally rectangular prism shape corresponding to the first spacer 334, is coupled with the bottom surface 344 of the second panel 304 along the front edge 346 of the second panel 304. A second plate 348 of the first hinge 330 is coupled with a lower surface 350 of the second spacer 342. The first and second spacers 334, 342 have a thickness that together is generally equal to or greater than the thickness of the third panel 306, allowing the third panel 306 to reside between the first and second panels 302, 304 with the panel assembly 300 in the stored position 308, as shown FIG. 16. A hinge pin 352 extends through and connects an edge portion 354 of the first and second plates 338, 348 of the first hinge 330 to provide a pivotal coupling between the first and second plates 338, 348. However, it is contemplated at the first and second panels 302, 304 may be configured such that the spacers 334, 342 may have a lesser thickness. And further, it is conceivable that the spacers 334, 342 and components of the first hinge 330 may be an integral piece of the first or second panel 302, 304. A second hinge 356 is coupled between a bottom surface 358 of the third panel 306 and the bottom surface 344 of the second panel 304. The second hinge 356 includes a first plate 360 coupled with the second panel 304 and a second plate 362 coupled with the third panel 306. A hinge pin 364, similar to the first hinge 330, extends through an edge portion 366 of the first and second plates 360, 362 to provide a lateral pivotal axis between the second and third panels 304, 306. The first and second hinges 330, 356 may conceivably include an alternative hinge construction, such as a living hinge or a segmented series of hinges, to pivotally connect the bottom surfaces of the first, second, and third panels 302, 304, 306. In addition, it is contemplated that components of the second hinge 356 may also be an integral piece of the second or third panel 304, 306.

Figure 15:
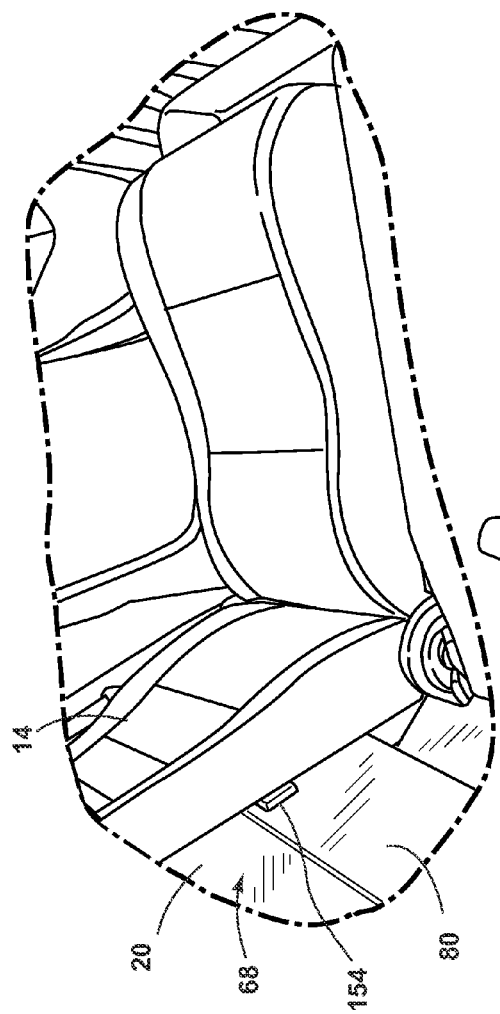
FIG. 15 is a top perspective view of the additional embodiment of the load floor assembly, as shown in FIG. 14, with the seatback in the upright position.
Figure 15A:
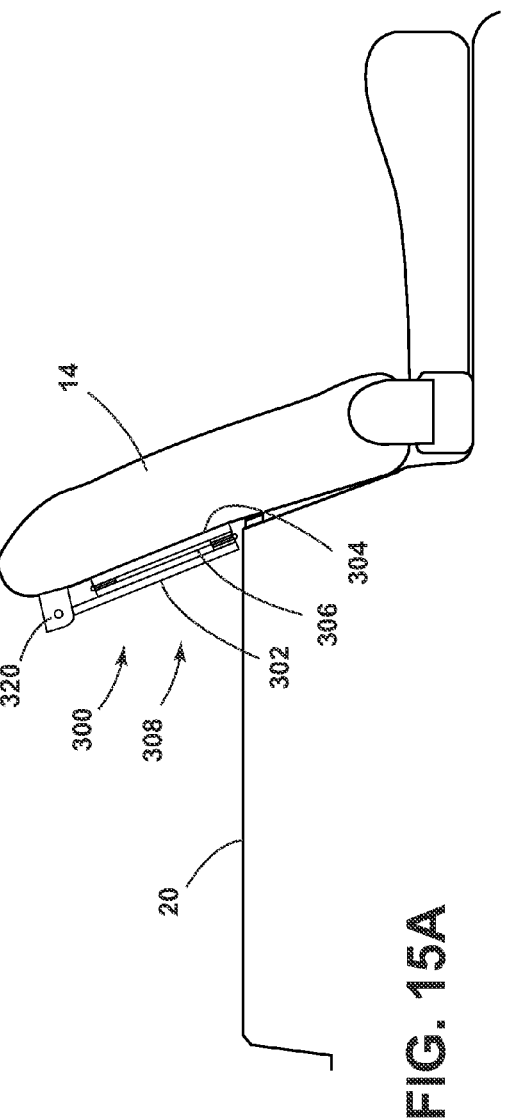
FIG. 15A is a schematic side elevational view of the additional embodiment of the load floor assembly, as shown in FIG. 15, having a panel assembly in a retained position.

As shown in FIGS. 15-15A, the additional embodiment of the panel assembly 300 of vehicle load floor 10 is shown with the panel assembly 300 in the stored position 308, wherein the second panel 304 is disposed between the first panel 302 and the seatback 14, and further, the third panel 306 is disposed between the first panel 302 and the second panel 304. As illustrated in FIGS. 16-16A, the panel assembly 300 is in the stored position 308 and the seatback 14 in the forward stowed position 18. The panel assembly 300 in the stored position 308 is in abutting contact with the rear surface of the seatback 14. It is contemplated that the panel assembly 300 may be secured in the stored position 308 with a retention feature, similar to the nylon strap shown in FIGS. 11-11A that extends from the rear surface of the seatback 14 and connects across the panel assembly 300.

Figure 17:
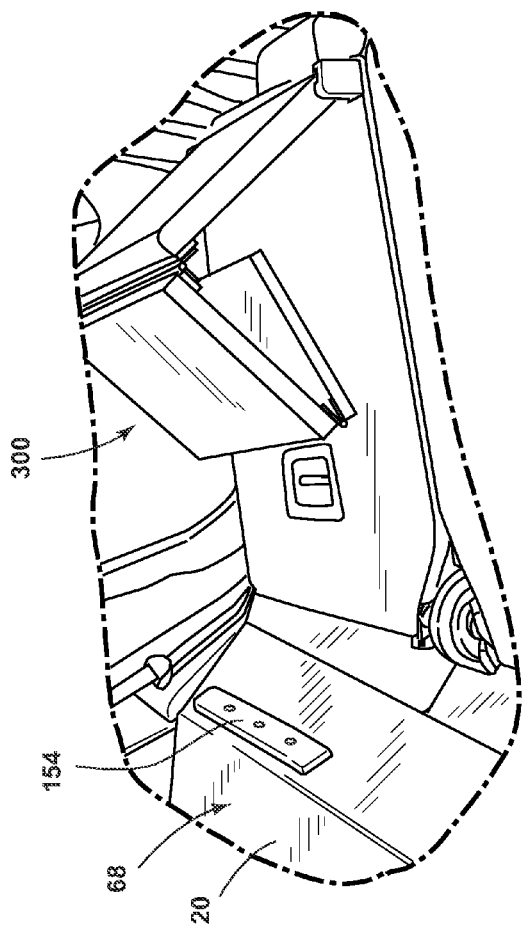
FIG. 17 is a top perspective view of the additional embodiment of the load floor assembly, as shown in FIG. 14, positioned between the retained position and a deployed position.
Figure 17A:
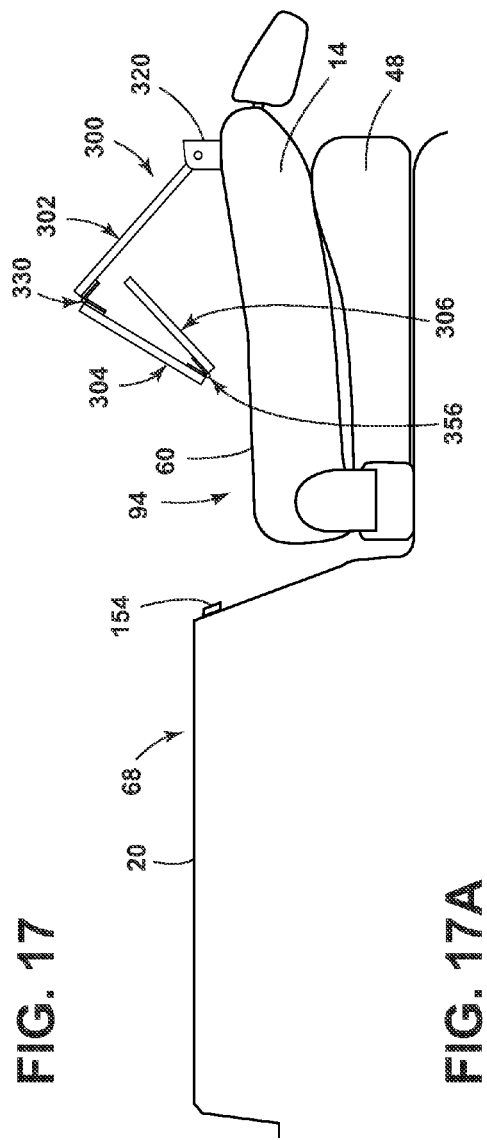
FIG. 17A is a schematic side elevational view of the load floor assembly, as shown in FIG. 17.

The additional embodiment of the panel assembly 300, as shown in FIGS. 17-17A, is partially deployed rearward. As shown, the first panel 302 is pivotally raised away from the rear surface 60 of the seatback 14 about the pivot pins 318, allowing the second panel 304 to pivot forward about the first hinge 330 away from the first panel 302, disengaging the bottom surface 332 of the first panel 302 with the upper surface 328 of the third panel 306. Further, after the second panel 304 is pivoted away from the first panel 302, the third panel 306 is permitted to pivot away from the second panel 304 about the second hinge 356, disengaging the bottom surfaces 344, 358 of the second and third panels 304, 306. It is contemplated that in operation the user may manipulate the first and second panels 302, 304 in addition to the third panel 306 to move the panel assembly 300 out of the stored position 308 (FIGS. 16-16A).

Figure 18:
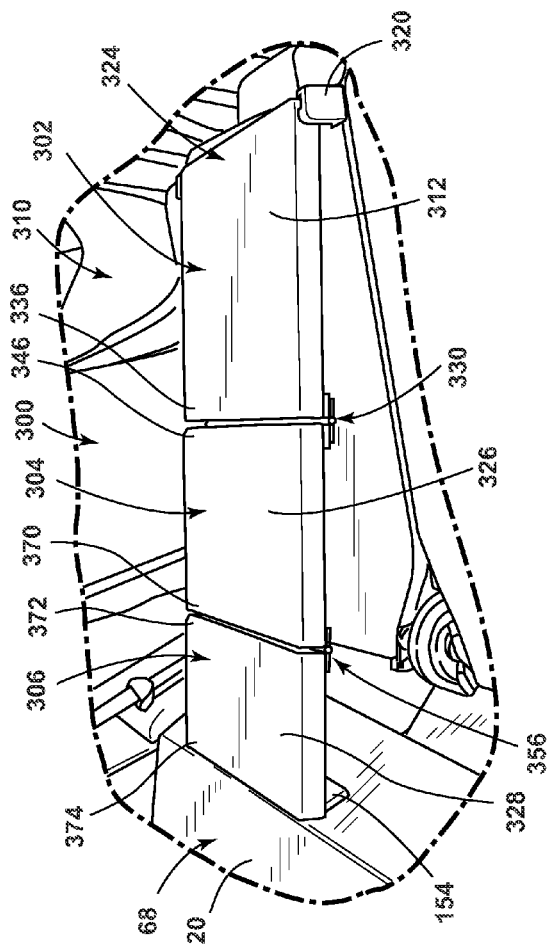
FIG. 18 is a top perspective view of the additional embodiment of the load floor assembly, as shown in FIG. 14, in the deployed position.
Figure 18A:
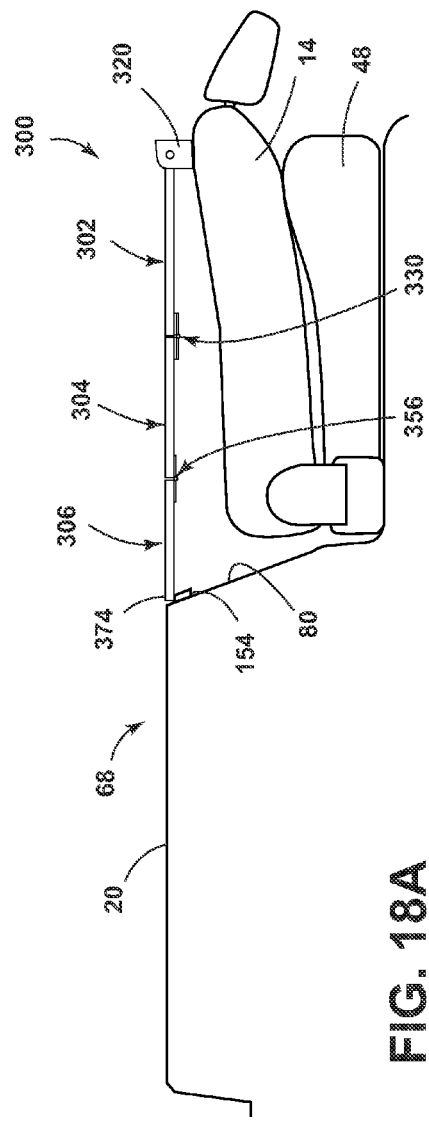
FIG. 18A is a schematic side elevational view of the additional embodiment of the load floor assembly as shown in FIG. 18.

As shown in FIGS. 18-18A, the additional embodiment of the panel assembly 300 is deployed rearward and engaged with the cargo floor 20 to define the support surface 28 in the deployed position 310. To complete the engagement, the second panel 304 is pivoted further away from the first panel 302 and the third panel 306 is pivoted further away from the second panel 304, placing the upper surfaces 312, 326, 328 of the first, second, and third panels 302, 304, 306 in substantially planar alignment. More specifically, the upper surfaces 312, 326, 328 of the first, second, and third panels 302, 304, 306 are placed in generally planar alignment with the top surface 72 of the cargo floor 20. The first and second hinges 330, 356 are arranged on the bottom surfaces to vertically support the panel assembly 300 in the deployed position 310, such that the first, second, and third panels 302, 304, 306 are held in planar alignment with support from the first and second hinges 330, 356. Also, in the deployed position 310, the substantially vertically planar rear edge 336 of the first panel 302 abuts the substantially vertically planar front edge 346 of the second panel 304 in compress to align the first and second panels 302, 304 in the deployed position 310, in combination with the first hinge 330 in tension between the first and second panels 302, 304. Likewise, the substantially vertically planar rear edge 370 of the second panel 304 and the substantially vertically planar forward edge 372 of the third panel 306 abut in compression to vertically support and align the second and third panels 304, 306 in the deployed position 310, in combination with the second hinge 356 in tension between the second and third panels 304, 306. Therefore, the panel assembly 300 is supported in the deployed position 310 by having the vertical edges of the panels in compression with each other and the first and second hinges 330, 356 in tension.

As also illustrated in the additional embodiment of the panel assembly 300 shown in FIGS. 18-18A, the rear edge 374 of the third panel 306 engages and is supported by the ledge member 154 that is coupled with the front wall 80 of the cargo area 62. Again, the ledge member 154 is coupled at a distance below the top surface 72 of the elevated portion 70 of the cargo floor 20 substantially equivalent to the thickness of the third panel 306, such that the upper surface 368 of the third panel 306 is in generally planar alignment with the top surface 72. Accordingly, the support surface 28 in the additional embodiment is defined by the aligned upper surfaces 312, 326, 368 of the first, second, and third panels 302, 304, 306. The support surface 28 is placed in planar alignment with the top surface 72 of the cargo floor 20 to provide a substantially flat surface to support an object that is preferably carried on such a flat surface and to support other types of objects. It is contemplated that the panel assembly 300 may be varied to include more or fewer panels to engage the floor 20 of the cargo area 62. As such, it is conceivable that the longitudinal length of the either or both of the first and second panels 302, 304 may be lengthened to allow the second panel 304 to engage the floor 20 of the cargo area 62, and thereby omit the third panel 306.

The described steps in moving the various embodiments of the panel assembly from the stored or retained position to the deployed position may be reversed to move the panel assembly back to the corresponding stored or retained positions. It is also contemplated that additional panels may be included to span between the cargo floor 20 and the upper portion 24 of the seatback 14 to provide a substantially planar support surface 28 to support a cargo item and to expand the usable cargo area 62 of the vehicle. Also, it is contemplated that the first and second panel assemblies 54, 56 may be combined or further divided to correlate with the split seatback arrangement.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle load floor assembly, comprising:
   a vehicle seat having a seatback pivotal between upright and stowed positions;
   a cargo floor extending rearward from the seat;
   a first panel pivotally coupled with a rear portion of the seatback and pivotal to a raised position away from the seatback in the stowed position; and
   a second panel coupled with the first panel and deployable rearward to engage the cargo floor with the first panel in the raised position to define a support surface, wherein the second panel is slidably coupled with the first panel and slidable rearward from a stored position to a deployed position.

2. The vehicle load floor assembly of claim 1, wherein the cargo floor includes an elevated surface that is horizontally disposed above and rearward from the seat.

3. The vehicle load floor assembly of claim 2, wherein the support surface engages the cargo floor to substantially align with the elevated surface.

4. The vehicle load floor assembly of claim 1, wherein the first panel pivots about a pivotal connection disposed laterally on an upper portion of the seatback.

5. The vehicle load floor assembly of claim 1, wherein the support surface includes a top surface of the first panel, and wherein the second panel is substantially disposed beneath the top surface in the stored position.

6. The vehicle load floor assembly of claim 1, further comprising:
   a third panel slidably coupled with the second panel and slidable rearward from the second panel in the deployed position to engage the cargo floor.

7. A cargo area of a vehicle, comprising:
   a seatback pivotal between an upright position and a stowed position;
   a floor extending rearward from the seatback; and
   a panel assembly pivotally coupled with an upper portion of the seatback and having a plurality of panels configured to slidably deploy rearward to a deployed position that engages the floor and defines a support surface when the seatback is in the stowed position.

8. The cargo area of claim 7, wherein the plurality of panels includes a first panel pivotally coupled with a rear portion of the seatback and pivotal to a raised position away from the seatback in the stowed position.

9. The cargo area of claim 8, wherein the plurality of panels includes a second panel slidably engaged with the first panel and slidable between a stored position and a deployed position extending rearward from the first panel.

10. The cargo area of claim 7, wherein the floor includes an elevated surface that is raised and horizontally disposed rearward from the seatback.

11. The cargo area of claim 10, wherein the support surface engages the floor to substantially align with the elevated surface.

12. A vehicle load floor assembly, comprising:
    a seatback pivotal forward to a stowed position;
    a floor extending rearward from the seatback;
    a first panel having a forward edge pivotally coupled with a rear portion of the seatback; and
    a second panel slidably coupled with the first panel and slidable rearward from a rear edge of the first panel to a deployed position engaging the floor when the seatback is in the stowed position.

13. The vehicle load floor assembly of claim 12, wherein the floor includes an elevated surface that is raised and horizontally disposed rearward from the seatback.

14. The vehicle load floor assembly of claim 13, wherein the first and second panels define a support surface for engaging the floor to substantially align the support surface with the elevated surface.

15. The vehicle load floor assembly of claim 12, wherein the first panel pivots about a pivotal connection disposed laterally on an upper portion of the seatback, and wherein the first panel is pivotal to a raised position away from a lower portion of the seatback.

16. The vehicle load floor assembly of claim 12, further comprising:
    a third panel slidably coupled with the second panel and slidable rearward from the second panel in the deployed position to engage the cargo floor.

* * * * *